(12) United States Patent
Lee et al.

(10) Patent No.: US 8,359,758 B2
(45) Date of Patent: Jan. 29, 2013

(54) CIRCUIT FOR CALCULATING A THREE-DIMENSIONAL INCLINATION ANGLE

(75) Inventors: Sung Sik Lee, Miryang (KR); Myung Lae Lee, Daejeon (KR); Chang Han Je, Daejeon (KR); Gunn Hwang, Seoul (KR); Chang Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 370 days.

(21) Appl. No.: 12/672,997

(22) PCT Filed: Apr. 15, 2008

(86) PCT No.: PCT/KR2008/002117
§ 371 (c)(1),
(2), (4) Date: Feb. 10, 2010

(87) PCT Pub. No.: WO2009/028778
PCT Pub. Date: Mar. 5, 2009

(65) Prior Publication Data
US 2011/0192040 A1 Aug. 11, 2011

(30) Foreign Application Priority Data
Aug. 29, 2007 (KR) .................. 10-2007-0087256

(51) Int. Cl.
*G01C 9/00* (2006.01)
(52) U.S. Cl. .................................. 33/366.11
(58) Field of Classification Search .. 33/366.11–366.14, 33/366.25
See application file for complete search history.

(56) References Cited

U.S. PATENT DOCUMENTS

| 4,761,889 A | * | 8/1988 | Cobern et al. ................. 33/302 |
| 4,811,491 A | * | 3/1989 | Phillips et al. ............. 33/366.12 |
| 4,951,510 A | * | 8/1990 | Holm-Kennedy et al. ....................... 73/862.041 |

(Continued)

FOREIGN PATENT DOCUMENTS

| JP | 63-169503 A | 7/1988 |
| JP | 08-021751 A | 1/1996 |

(Continued)

OTHER PUBLICATIONS

Ik-Su Kang et al., "Design and Fabrication of a Micro Electro Mechanical Systems-Based Electrolytic Tilt Sensor," Japanese Journal of Applied Physics, 2006, pp. 5626-5630, vol. 45, No. 6B.

(Continued)

*Primary Examiner* — Christopher Fulton

(57) ABSTRACT

A three-dimensional inclination angle calculation circuit is provided. The three-dimensional inclination angle calculation circuit includes: X-axis, Y-axis, and Z-axis vibration sensors which change X-axis, Y-axis, and Z-axis electrostatic capacitances according to three-dimensional positions of a measured plane with respect to a reference plane, respectively; X-axis, Y-axis, and Z-axis position value acquisition units which acquire X-axis, Y-axis, and Z-axis position values corresponding to the X-axis, Y-axis, and Z-axis electrostatic capacitances, respectively; and an inclination angle calculation unit which calculates an inclination angle of the measured plane with respect to the reference plane based on the X-axis, Y-axis, and Z-axis position values. Accordingly, it is possible to very easily calculate an inclination angle according to a three-dimensional position of a to-be-measured apparatus by using an existing vibration sensor.

6 Claims, 8 Drawing Sheets

U.S. PATENT DOCUMENTS

| | | | |
|---|---|---|---|
| 5,428,902 A | 7/1995 | Cheah | |
| 6,138,066 A * | 10/2000 | Guo et al. | 701/38 |
| 7,137,208 B2 * | 11/2006 | Campbell et al. | 33/366.13 |
| 7,523,664 B2 * | 4/2009 | Shoji et al. | 73/514.31 |
| 7,562,461 B2 * | 7/2009 | Van Kann | 33/366.25 |
| 7,762,134 B2 * | 7/2010 | Katsumata | 73/504.12 |
| 2001/0004847 A1 * | 6/2001 | Moriya et al. | 73/504.12 |
| 2002/0073563 A1 | 6/2002 | Toda et al. | |
| 2005/0210979 A1 | 9/2005 | Urano et al. | |
| 2006/0161363 A1 * | 7/2006 | Shibasaki et al. | 702/94 |
| 2008/0257045 A1 * | 10/2008 | Takashima | 73/514.32 |
| 2009/0126490 A1 * | 5/2009 | Sameshima | 73/514.32 |
| 2011/0154898 A1 * | 6/2011 | Cazzaniga et al. | 73/504.12 |

FOREIGN PATENT DOCUMENTS

| | | |
|---|---|---|
| JP | 11-316881 A | 11/1999 |
| JP | 2000-337872 A | 12/2000 |
| JP | 2003-106835 A | 4/2003 |
| JP | 2004-045190 A | 2/2004 |
| JP | 2004-212124 A | 7/2004 |
| JP | 2004-333372 A | 11/2004 |
| JP | 2006-220469 A | 8/2006 |
| JP | 2007-113976 A | 5/2007 |
| KR | 1997-0002260 A | 1/1997 |
| KR | 1020010055176 A | 7/2001 |

OTHER PUBLICATIONS

International Search Report for PCT/KR2008/002117 filed on Apr. 15, 2008.

Written Opinion of the International Searching Authority for PCT/KR2008/002117 filed on Apr. 15, 2008.

* cited by examiner

A – A'

$C_{s1} = C_{s2}$ (a)

$C_{s1} < C_{s2}$ (b)

$C_{s1} > C_{s2}$ (c)

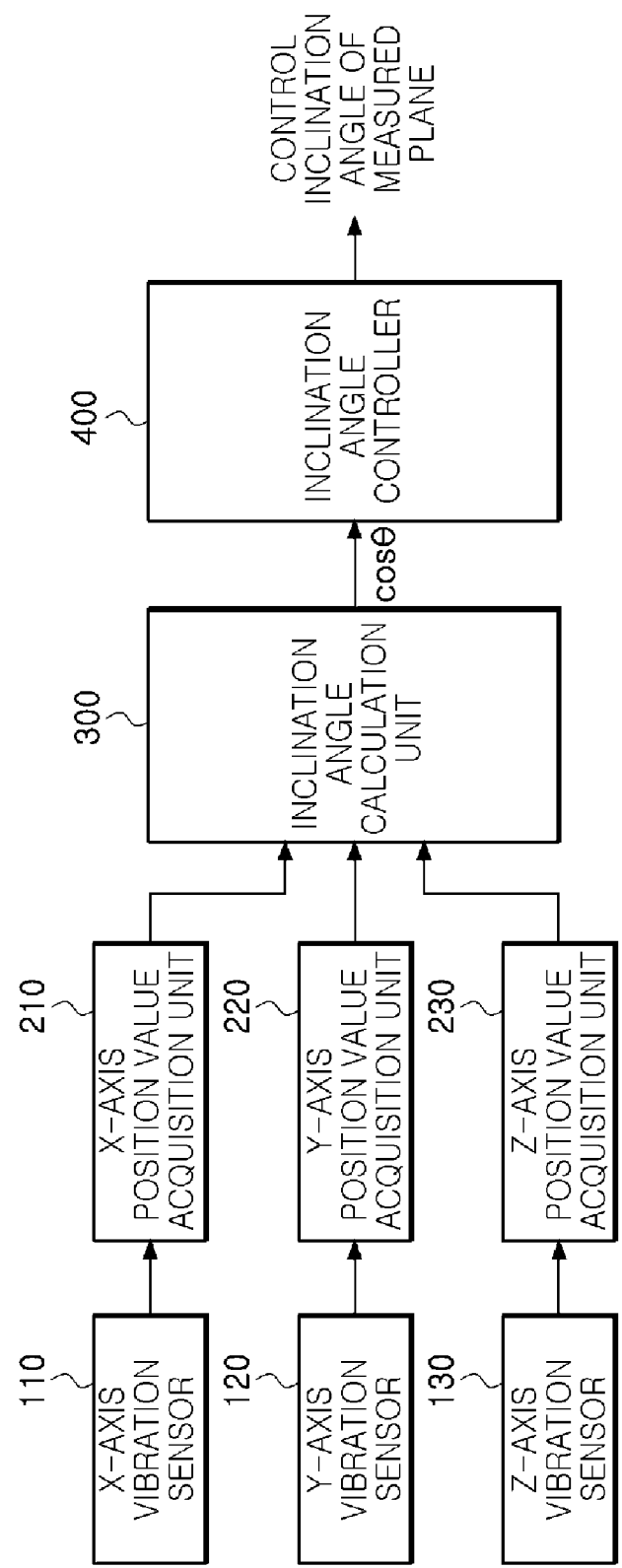

CIRCUIT FOR CALCULATING A THREE-DIMENSIONAL INCLINATION ANGLE

TECHNICAL FIELD

The present invention relates to an inclination angle calculation circuit, and more particularly, to an inclination angle calculation circuit capable of calculating a three-dimensional inclination angle by using vibration sensors implemented with a micro electro-mechanical system (MEMS) technology.

This work was supported by the IT R&D program of MIC/IITA [2005-S-106-03, Development of CMOS based MEMS processed multi-functional sensor for ubiquitous environment]

BACKGROUND ART

A micro electro-mechanical system (hereinafter, referred to as a MEMS) technology is a technology for combining micro-mechanical devices such as sensors, valves, gears, reflecting minors, and drivers integrated into a semiconductor chip to a computer.

Recently, the MEMS is used for a navigation system, a sensor built in a wing structure of an airplane to sense airflow according to a change of resistance on a surface of the wing of the airplane, an optical switching apparatus for switching optical signals among separate paths at a rate of 20 ns, a sensor-driven air-conditioning system, a sensor built in a base of a building to smoothly change a property of a material according to sensed pressure of the air, and the like. As the most respective MEMS, there is a vibration sensor or a magnetic sensor built in an airbag of a vehicle.

FIG. 1 is a view illustrating an example of a vibration sensor using the MEMS.

Referring to FIG. 1, the vibration sensor 10 includes a moving object M of which position is changed according to a vibration and position of the vibration sensor and two fixed electrodes Es1 and Es2 which are disposed at both sides of the moving object M to obtain electrostatic capacitances Cs1 and Cs1 corresponding to distances from the moving object M.

As the position of the vibration sensor 10 is changed according to an external environment, the position of the moving object M is also changed, so that a distance between the two fixed electrode Es1 and Es2 is also changed. As a result, the electrostatic capacitances Cs1 and Cs1 obtained by the two fixed electrode Es1 and Es2 is changed.

For example, as shown in (a) of FIG. 2, if the vibration sensor 10 is maintained parallel to a reference plane, the distances of the moving object M from the two fixed electrode Es1 and Es2 are equal to each other (d1=d2). Therefore, the electrostatic capacitances Cs1 and Cs1 obtained by the fixed electrode Es1 and Es2 are equal to each other.

However, as shown in (b) of FIG. 2, if the vibration sensor 10 is inclined leftwards with an angle θ, the moving object M is inclined rightwards. Therefore, the distance d2 between the moving object M and the second fixed electrodes Es2 is smaller than the distance d1 between the moving object M and the first fixed electrodes Es1. Accordingly, the electrostatic capacitance Cs2 obtained by the second fixed electrodes Es2 is larger than the electrostatic capacitance Cs1 obtained by the first fixed electrodes Es1.

On the other hand, as shown in (c) of FIG. 2, if the vibration sensor 10 is inclined rightwards with an angle θ, the moving object M is also inclined leftwards. Therefore, the distance d1 between the moving object M and the first fixed electrodes Es1 is smaller than the distance d2 between the moving object M and the second fixed electrodes Es2. Accordingly, the electrostatic capacitance Cs1 obtained by the first fixed electrodes Es1 is larger than the electrostatic capacitance Cs2 obtained by the second fixed electrodes Es2.

In this manner, the vibration sensor 10 of FIG. 1 can change the two electrostatic capacitances Cs1 and Cs2 according to the position thereof, so that the vibration sensor can notify the position thereof.

DISCLOSURE OF INVENTION

Technical Problem

Recently, as the MEMS technology is required in various industrial fields, there is a need to provide various types of information obtained by sensors implemented by using the MEMS technology. However, there is a problem in that only limited information such as the aforementioned positional information is provided.

Technical Solution

According to a first aspect of the present invention, there is provided a three-dimensional inclination angle calculation circuit comprising: X-axis, Y-axis, and Z-axis vibration sensors which change X-axis, Y-axis, and Z-axis electrostatic capacitances according to three-dimensional positions of a measured plane with respect to a reference plane, respectively; X-axis, Y-axis, and Z-axis position value acquisition units which acquire X-axis, Y-axis, and Z-axis position values corresponding to the X-axis, Y-axis, and Z-axis electrostatic capacitances, respectively; and an inclination angle calculation unit which calculates an inclination angle of the measured plane with respect to the reference plane based on the X-axis, Y-axis, and Z-axis position values.

In the above aspect, the inclination angle calculation unit may calculate the inclination angle of the measured plane by using the following Equation.

$$e^{\frac{1}{2}\{\ln z^2 - \ln(x^2+y^2+z^2)\}} = e^{\frac{1}{2}\ln \frac{z^2}{x^2+y^2+z^2}}$$
$$= e^{\ln \sqrt{\frac{z^2}{x^2+y^2+z^2}}}$$
$$= \sqrt{\frac{z^2}{x^2+y^2+z^2}}$$
$$= \cos\theta$$

In addition, the inclination angle calculation unit may comprise: x-value, y-value, and z-value squaring units which square the X-axis, Y-axis, and Z-axis position values, respectively; a squared-value summation unit which sums up output values of the x-value, y-value, and z-value squaring units; a summed-value log transformation unit which transforms an output value of the squared-value summation unit into a log value by using a logarithm function; a z-squared-value log transformation unit which transforms an output value of the x-value squaring unit into a log value by using a logarithm function; a log value subtraction unit which subtracts an output value of the squared-value summation unit from an output value of the z-squared-value log transformation unit; a damping unit which damps an output value of the log value subtraction unit by ½; and an exponential transformation unit which transforms an output value of the damping unit by using an exponential function to obtain a cosine value of the inclination angle.

In addition, each of the X-axis, Y-axis, and Z-axis position value acquisition units may comprise: an ROIC (read-out IC) which generates a signal having a signal value corresponding to the electrostatic capacitance acquired by the corresponding vibration sensor; and a low pass filter which filters a high frequency component of the signal generated by the ROIC to acquire a position value.

In addition, the three-dimensional inclination angle calculation circuit may further comprise an inclination angle controller controls the inclination angle of the measured with reference to the output signal of the inclination angle calculation unit so as to locate the measured plane on the reference plane.

Advantageous Effects

Accordingly, the three-dimensional inclination angle calculation circuit according to the present invention can very easily detect the inclination angle of the measured plane with respect to the reference plane, that is, the inclination angle of a to-be-measured apparatus by using an existing sensor without manufacturing a new sensor.

BRIEF DESCRIPTION OF THE DRAWINGS

FIG. 8 is a block diagram illustrating an inclination angle calculation circuit according to another embodiment of the present invention.

BEST MODE FOR CARRYING OUT THE INVENTION

Figure 1:
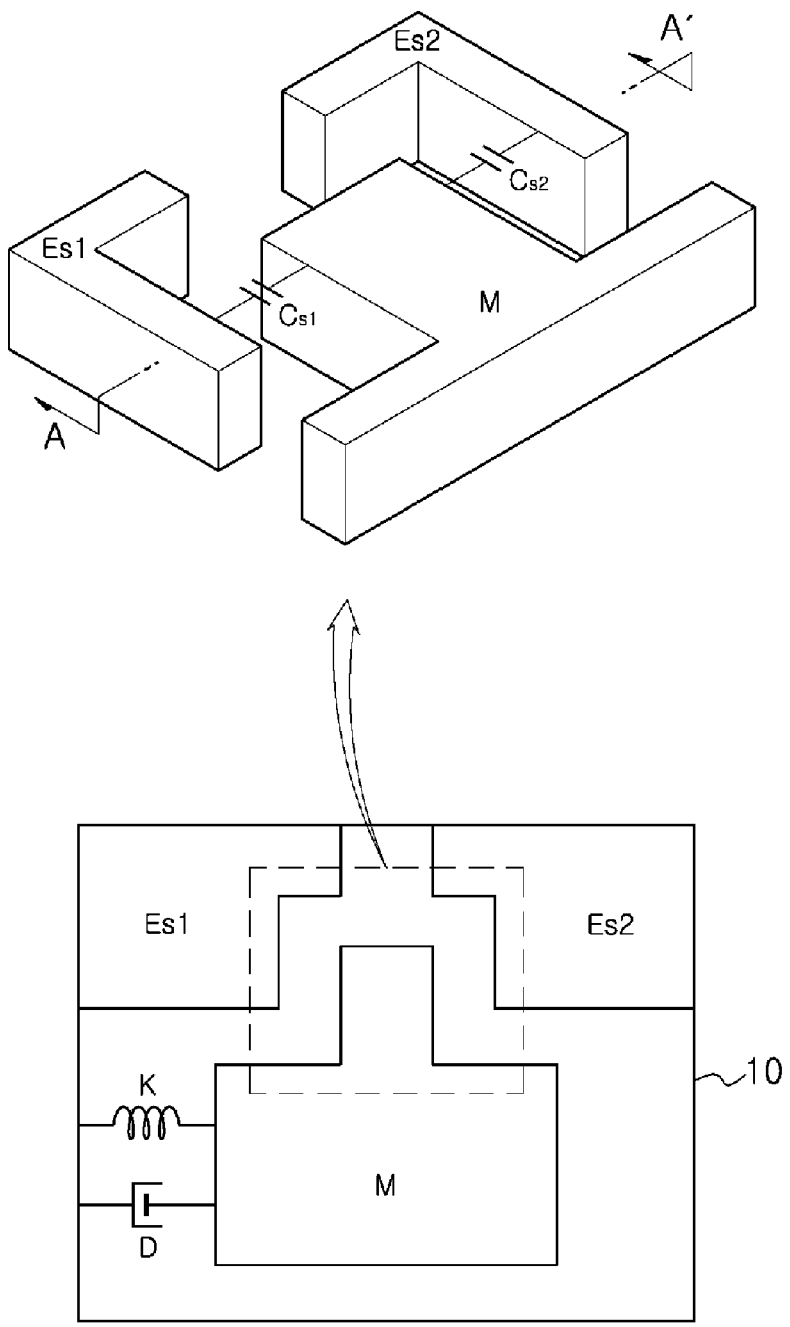
FIG. 1 is a view illustrating an example of a vibration sensor using a MEMS.
Figure 2:
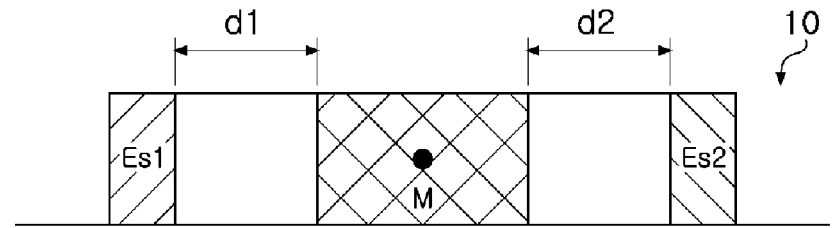
FIG. 2 is a view for explaining a relationship between a position of a vibration sensor and electrostatic capacitance.
Figure 2:
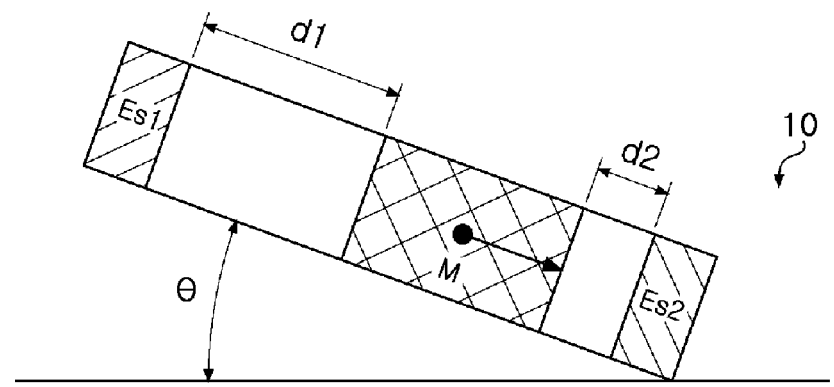
Figure 2:
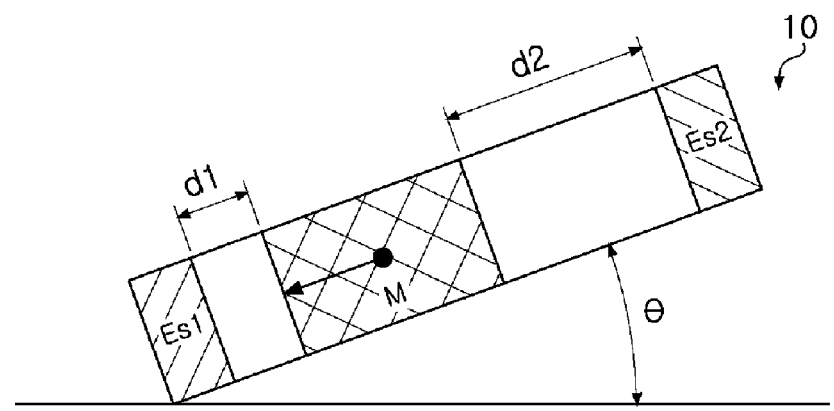

Hereinafter, embodiments of the present invention will be described in detail with reference to the accompanying drawings so that the ordinarily skilled in the art can easily implement the embodiments. However, in the detailed description of operational principles of the embodiments of the present invention, detailed description of well-known construction and operations will be omitted for clarifying the present invention.

In addition, in the drawings, elements having similar functions and operations are denoted by the same reference numerals.

Before the present invention is described in detail, a principle of detecting an inclination angle used for the present invention will be described.

Figure 3:
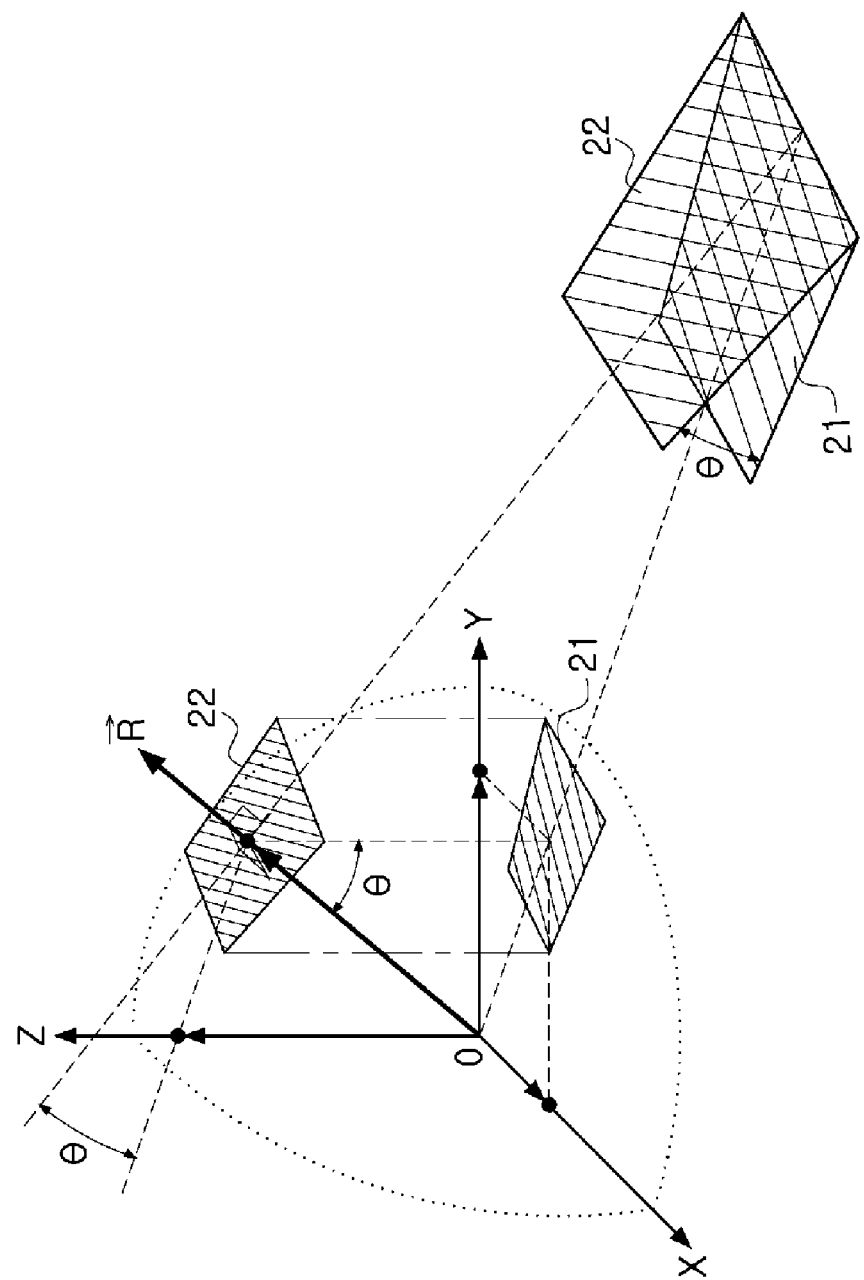
FIG. 3 is a view for explaining an inclination angle detecting method.

FIG. 3 is a view for explaining a principle of detecting a three-dimensional inclination angle according to an embodiment of the present invention.

Reference numeral 21 denotes a reference plane, and reference numeral 22 denotes a measured plane of a to-be-measured apparatus.

As shown in FIG. 3, when the measured plane 22 is three-dimensionally disposed to have a predetermined inclination angle θ with respect to the reference plane 21, the inclination angle θ of the measured plane 22 is equal to an angle between a position vector $\vec{R}$ of reference plane 21 and a Z axis.

In a rectangular coordinate system, the position vector $\vec{R}$ with respect to an origin (0, 0, 0) can be expressed by Equation 1, and a cosine value cos θ of the inclination angle θ can be expressed by Equation 2.

$$\vec{R} = R\hat{R} = \sqrt{x^2 + y^2 + z^2}\hat{R} \qquad \text{[Equation 1]}$$

Here, x denotes an X-axis inclination component of the measured plane 22, y denotes a Y-axis inclination component of the measured plane 22, z denotes a Z-axis inclination component of the measured plane 22, and $\vec{R}$ denotes a unit vector of the position vector.

$$\cos\theta = \sqrt{\frac{z^2}{x^2 + y^2 + z^2}} \qquad \text{[Equation 2]}$$

Therefore, only if the X-axis, Y-axis, and Z-axis position values of the measured plane 22 are obtained, the cos θ of the measured plane 22 can be easily calculated, so that the inclination angle θ can be accurately obtained.

Accordingly, the present invention proposes an inclination angle calculation circuit in which, after the three-dimensional position value (x, y, x) of the measured plane 22 is obtained by using the MEMS technique, the inclination angle θ of the measured plane 22 is obtained by using an inclination angle detection principle shown in FIG. 3.

Figure 4:
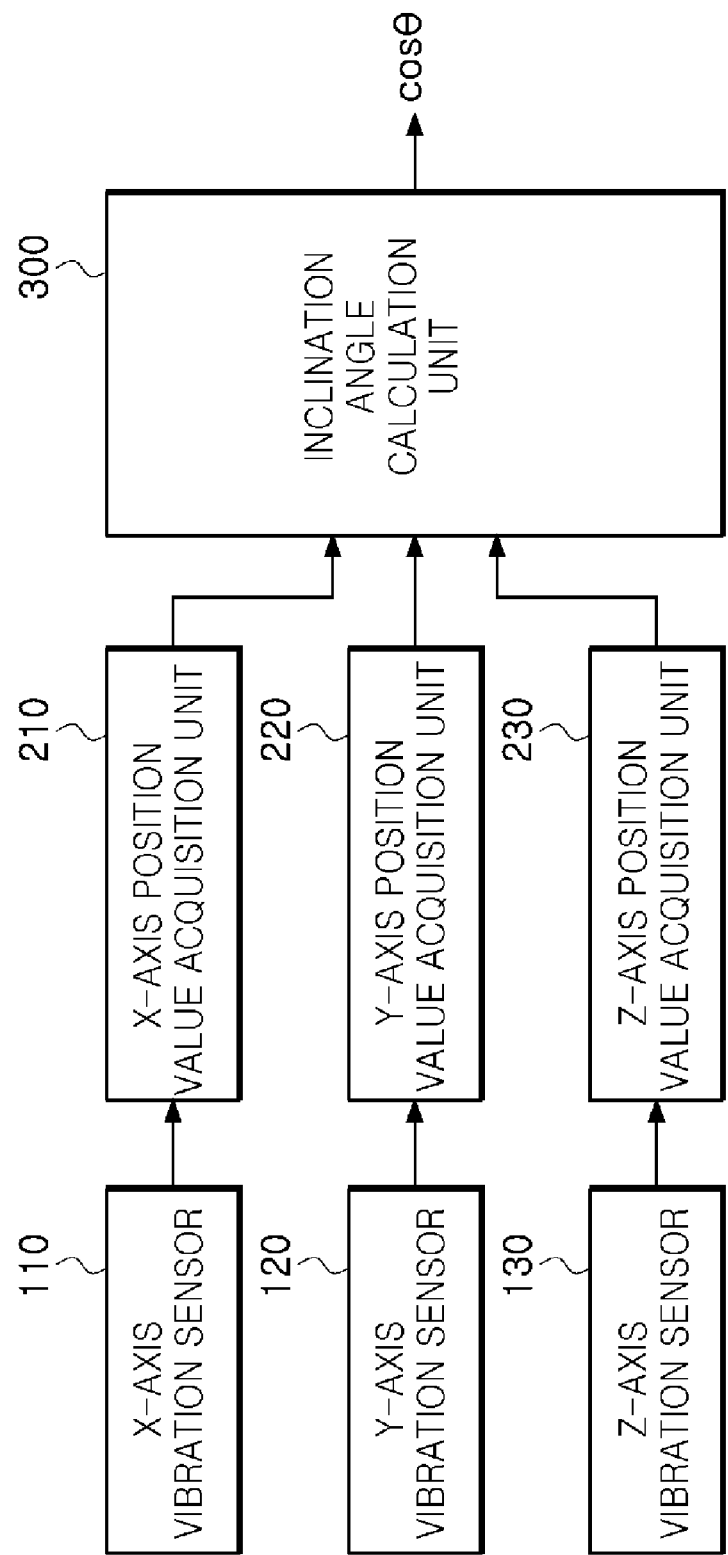
FIG. 4 is a block diagram illustrating an inclination angle calculation circuit according to an embodiment of the present invention.

FIG. 4 is a block diagram illustrating a three-dimensional inclination angle calculation circuit according to an embodiment of the present invention.

Referring to FIG. 4, the inclination angle calculation circuit includes X-axis, Y-axis, and Z-axis vibration sensors 110 to 130, X-axis, Y-axis, and Z-axis position value acquisition units 210 to 230, and an inclination angle calculation unit 300.

The X-axis, Y-axis, and Z-axis vibration sensors 110 to 130 are disposed on the measured plane 22, X-axis, Y-axis, and Z-axis electrostatic capacitances are designed to changed according to the X,Y,Z-axis inclination components of the measured plane 22 with respect to the reference plane 21. For example, the X-axis vibration sensor 110 generates the X-axis electrostatic capacitance corresponding to the three-dimensional position of the measured plane 22 with respect to the reference plane 21.

The X-axis, Y-axis, and Z-axis position value acquisition units 210 to 230 detect the X-axis, Y-axis, and Z-axis electrostatic capacitances and acquire the X-axis, Y-axis, and Z-axis position values based on the X-axis, Y-axis, and Z-axis electrostatic capacitances.

Here, the X-axis, Y-axis, and Z-axis position values may be one of voltage, current, and frequency. Hereinafter, for the convenience of description, the voltage is selected as the signal value.

The inclination angle calculation unit 300 receives the X-axis, Y-axis, and Z-axis position values and calculates the following functions expressed by Equations 3 and 4 to obtain a cosine value cos θ of the inclination angle θ.

$$\ln\sqrt{\frac{z^2}{x^2+y^2+z^2}} = \frac{1}{2}\ln\frac{z^2}{x^2+y^2+z^2}$$
$$= \frac{1}{2}\{\ln z^2 - \ln(x^2+y^2+z^2)\}$$

[Equation 3]

$$e^{\frac{1}{2}\{\ln z^2 - \ln(x^2+y^2+z^2)\}} = e^{\frac{1}{2}\ln\frac{z^2}{x^2+y^2+z^2}}$$
$$= e^{\ln\sqrt{\frac{z^2}{x^2+y^2+z^2}}}$$
$$= \sqrt{\frac{z^2}{x^2+y^2+z^2}}$$
$$= \cos\theta$$

[Equation 4]

Here, x, y, and z denote the X-axis, Y-axis, and Z-axis position values, respectively.

Figure 5:
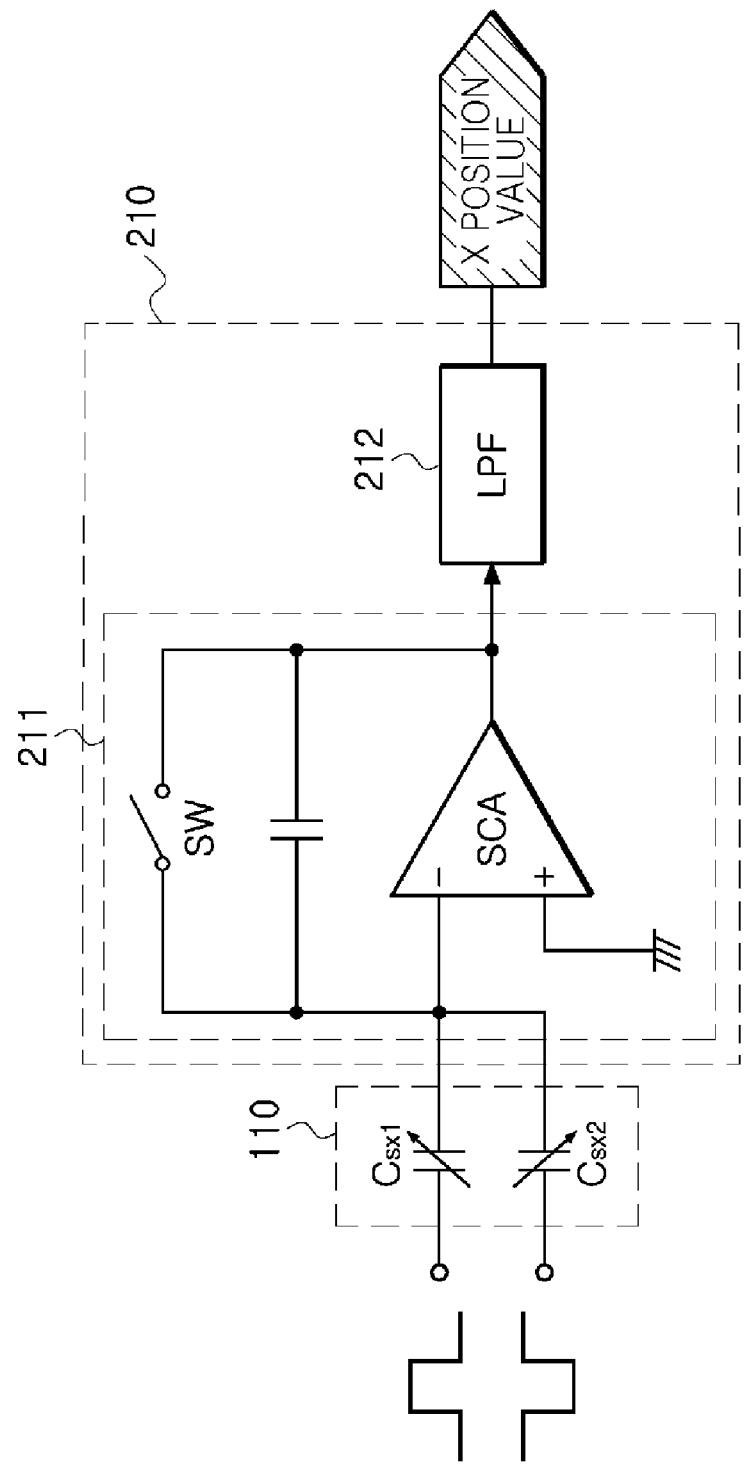
FIG. 5 is a detailed view illustrating one of X-axis, Y-axis, and Z-axis position value acquisition units according to an embodiment of the present invention.

FIG. 5 is a detailed view illustrating one of the X-axis, Y-axis, and Z-axis position value acquisition units 210 to 230 according to an embodiment of the present invention.

Referring to FIG. 5, the X-axis position value acquisition unit 210 includes a read-out integrated circuit (ROIC) 211 and a low pass filter (LPF) 212.

The ROIC 211 is constructed with a switched-capacitor amplifier (SCA). The ROIC 211 outputs a signal having a voltage value corresponding to the electrostatic capacitances Csx1 and Csx2 acquired by the X-axis vibration sensor 110.

The SCA has a negative terminal to which the two electrostatic capacitances Csx1 and Csx2 acquired by the X-axis vibration sensor 110 are connected parallel to each other and to which a capacitance Cint for feedback of an output signal of the SCA and a reset switch SW are connected parallel to each other, and a position terminal which is connected to a ground.

The LPF 212 filters a high frequency component from an output signal of the ROIC 211 to output only a low frequency component. That is, the LPF removes a vibration component and a noise component from the position value of the measured plane 22 to acquire only the inclination component of the measured plane 22.

Figure 6:
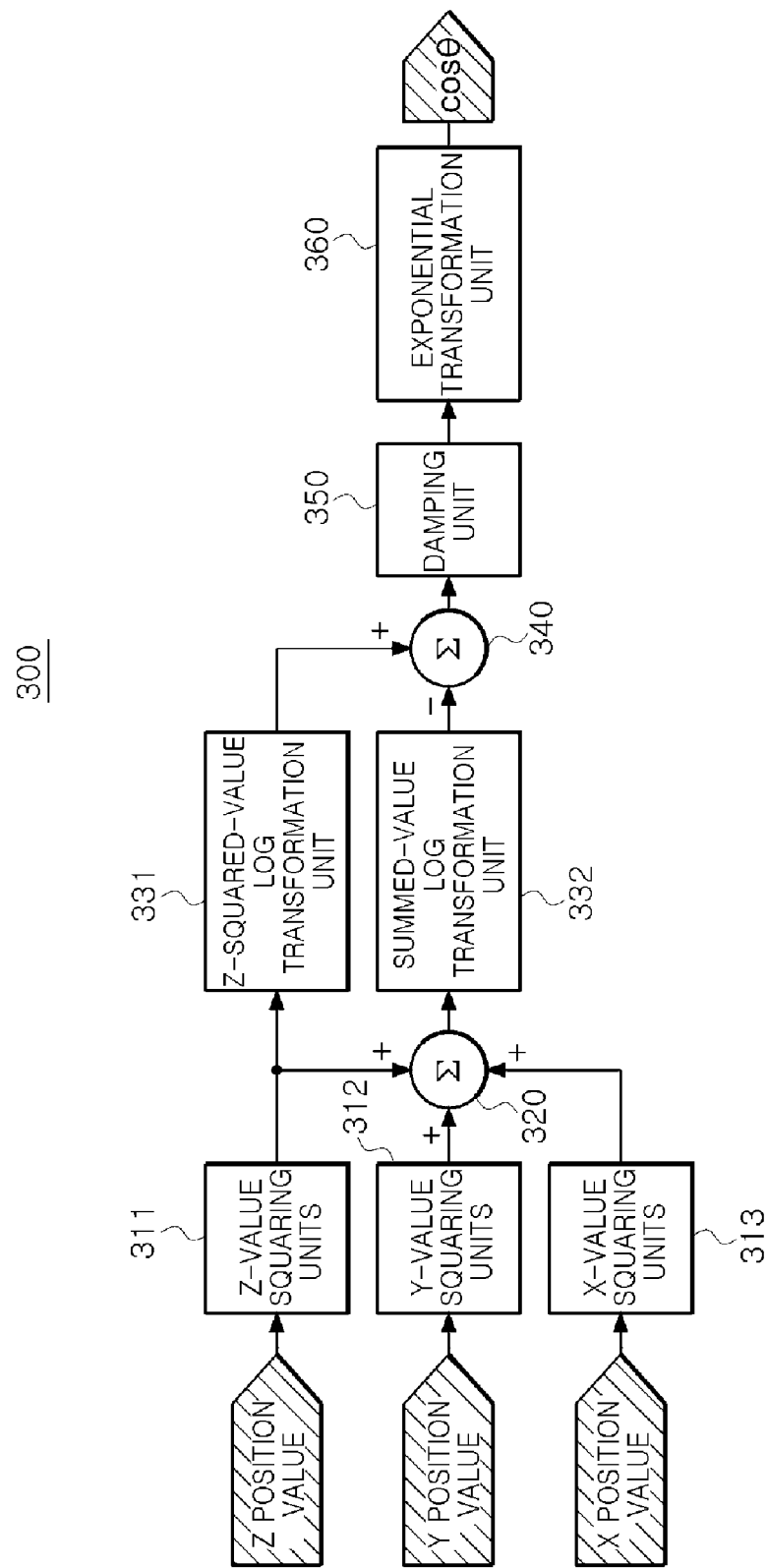
FIG. 6 is a detailed view illustrating an inclination angle calculation circuit according to an embodiment of the present invention.

FIG. 6 is a detailed view illustrating an inclination angle calculation circuit 300 according to an embodiment of the present invention.

Referring to FIG. 6, the inclination angle calculation unit 300 includes x-value, y-value, and z-value squaring units 311 to 313, a squared-value summation unit 320, a z-squared-value log transformation unit 331, a summed-value log transformation unit 332, a log value subtraction unit 340, a damping unit 350, and an exponential transformation unit 360.

The x-value, y-value, and z-value squaring units 311 to 313 square the X-axis, Y-axis, and Z-axis position values x, y, and z acquired by the X-axis, Y-axis, and Z-axis position value acquisition units 210 to 230, respectively.

The squared-value summation unit 320 receives and sums up the squared X-axis, Y-axis, and Z-axis position values $x^2$, $y^2$, and $z^2$ from the x-value, y-value, and z-value squaring units 311 to 313.

The z-squared-value log transformation unit 331 performs logarithm transform on the squared Z-axis position value $z^2$ output from the z-value squaring unit 311 by using logarithm function.

The summed-value log transformation unit 332 performs logarithm transforming on the summed-value $x^2+y^2+z^2$ output from the squared-value summation unit 320 by using logarithm function.

The log value subtraction unit 340 subtracts the output value $\ln(x^2+y^2+z^2)$ of the summed-value log transformation unit 332 from output value $\ln z^2$ of the z-squared-value log transformation unit 331.

The damping unit 350 divides the output value $\ln z^2 - \ln(x^2+y^2+z^2)$ of the log value subtraction unit by ½.

The exponential transformation unit 360 performs exponential transform on the output value ½($\ln z^2 - \ln(x^2+y^2+z^2)$) of the damping unit 350 by using an exponential function to obtain the cosine value cos θ of the inclination angle θ as expressed by Equation 4 and outputs the cosine value cos θ.

Figure 7:
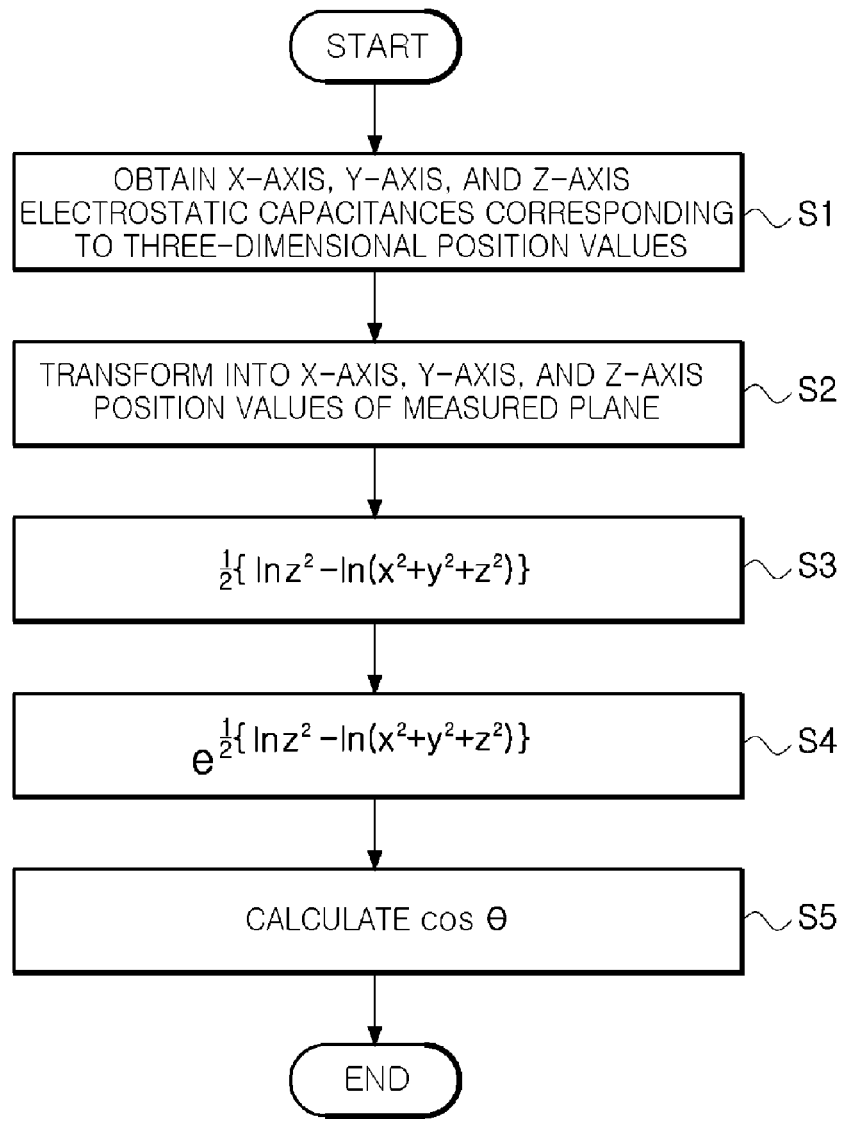
FIG. 7 is a flowchart illustrating operations of an inclination angle detecting method according to an embodiment of the present invention.

FIG. 7 is a flowchart illustrating operations of a three-dimensional inclination angle detecting method according to an embodiment of the present invention.

Firstly, every time when a three-dimensional position of a measured plane 22 is changed, X-axis, Y-axis, and Z-axis vibration sensors 110 to 130 obtain X-axis, Y-axis, and Z-axis electrostatic capacitances corresponding to the changed three-dimensional position (S1).

Next, X-axis, Y-axis, and Z-axis position value acquisition units 210 to 230 generate X-axis, Y-axis, and Z-axis position values corresponding to the X-axis, Y-axis, and Z-axis electrostatic capacitances obtained by the X-axis, Y-axis, and Z-axis vibration sensors 110 to 130 and output the X-axis, Y-axis, and Z-axis position values (S2).

An inclination angle calculation unit 300 perform calculation of Equation 3 on the X-axis, Y-axis, and Z-axis position values generated in operation S2 (S3) and performs exponential transformation on the result of the calculation by using Equation 4 (S4) to obtain a cosine value cos θ of an inclination angle θ (S5).

In the above embodiment, only the circuit and method of calculating the inclination angle θ of the to-be-measured apparatus are described. However, if needed, the following separate control operations may be performed by using the inclination angle θ as calculated in FIG. 8.

FIG. 8 is a block diagram illustrating a three-dimensional inclination angle calculation circuit according to another embodiment of the present invention.

Referring to FIG. 8, the inclination angle calculation circuit includes X-axis, Y-axis, and Z-axis vibration sensors 110 to 130, X-axis, Y-axis, and Z-axis position value acquisition units 210 to 230, an inclination angle calculation unit 300, and an inclination angle controller 400.

In FIG. 8, the same elements and operations as those of FIG. 4 are denoted by the same reference numerals as those of FIG. 3, and detailed description thereof is omitted.

An inclination angle controller 400 calculates an inclination angle θ of a measured plane 22 which is to be measured by an inclination angle calculation circuit based on a cosine value cos θ of an inclination angle θ obtained by an inclination angle calculation unit 300 and, after that, controls a three-dimensional position of the measured plane 22 by using the inclination angle θ.

For example, in response to the inclination angle θ obtained by the inclination angle calculation unit 300, the inclination angle controller 400 controls the measured plane 22 to be always disposed on the reference plane 21.

In addition, if needed, the three-dimensional position value of the reference plane 21 may be controlled to be actively changed, and the three-dimensional position value of the measured plane 22 may be controlled to be actively changed.

In the aforementioned embodiment, vibration sensors of sensing two electrostatic capacitances Csx1 and Csx2 are exemplified. However, it should be noted that the present invention can be adapted to a case where the vibration sensor senses one electrostatic capacitance Csx1.

As an example, in addition to the vibration sensor, a reference electrostatic capacitance may be further included. The electrostatic capacitance Csx1 sensed by the vibration sensor may be selected as a first electrostatic capacitances C1, and the reference electrostatic capacitance may be selected as a second electrostatic capacitances, so that the present invention can be adapted in the same manner.

While the present invention has been particularly shown and described with reference to exemplary embodiments thereof, it will be understood by those skilled in the art that various changes in form and details may be made therein without departing from the spirit and scope of the present invention as defined by the appended claims.

The invention claimed is:

1. A three-dimensional inclination angle calculation circuit, comprising:
X-axis, Y-axis, and Z-axis vibration sensors configured to provide X-axis, Y-axis, and Z-axis electrostatic capacitances according to three-dimensional positions of a measured plane with respect to a reference plane, respectively;
X-axis, Y-axis, and Z-axis position value acquisition units configured to acquire X-axis, Y-axis, and Z-axis position values corresponding to the X-axis, Y-axis, and Z-axis electrostatic capacitances, respectively; and
an inclination angle calculation unit configured to calculate an inclination angle of the measured plane with respect to the reference plane based on the X-axis, Y-axis, and Z-axis position values,
wherein each of the X-axis, Y-axis, and Z-axis position value acquisition units comprises:
an ROIC (read-out IC) configured to generate a signal having a signal value corresponding to the electrostatic capacitance acquired by the corresponding vibration sensor, wherein the ROIC includes an SCA (switched capacitor amplifier) having a negative terminal to which two electrostatic capacitances obtained by the corresponding vibration sensor are connected parallel to each other and to which a capacitance for feedback of an output signal thereof and a reset switch are connected parallel to each other and a positive terminal connected to a ground; and
a low pass filter configured to filter a high frequency component of the signal generated by the ROIC to acquire the position value.

2. The three-dimensional inclination angle calculation circuit according to claim 1, wherein the inclination angle calculation unit is configured to calculate the inclination angle of the measured plane by using the following Equation, $$e^{\frac{1}{2}\{\ln z^2 - \ln(x^2+y^2+z^2)\}} = e^{\frac{1}{2}\ln \frac{z^2}{x^2+y^2+z^2}}$$
$$= e^{\ln \sqrt{\frac{z^2}{x^2+y^2+z^2}}}$$
$$= \sqrt{\frac{z^2}{x^2+y^2+z^2}}$$
$$= \cos\theta$$

wherein x is the X-axis position value, y is the Y-axis position value, and z is the Z-axis position value.

3. The three-dimensional inclination angle calculation circuit according to claim 2, wherein the inclination angle calculation unit comprises:
x-value, y-value, and z-value squaring units configured to square the X-axis, Y-axis, and Z-axis position values, respectively;
a squared-value summation unit configured to sum up output values of the x-value, y-value, and z-value squaring units;
a summed-value log transformation unit configured to transform an output value of the squared-value summation unit into a log value by using a logarithm function;
a z-squared-value log transformation unit configured to transform an output value of the z-value squaring unit into a log value by using a logarithm function;
a log value subtraction unit configured to subtract an output value of the summed-value log transformation unit from an output value of the z-squared-value log transformation unit;
a damping unit configured to damp an output value of the log value subtraction unit by ½; and
an exponential transformation unit configured to transform an output value of the damping unit by using an exponential function to obtain a cosine value of the inclination angle.

4. The three-dimensional inclination angle calculation circuit according to claim 1, wherein the signal value is one of a voltage, a current, and a frequency.

5. The three-dimensional inclination angle calculation circuit according to claim 1, further comprising an inclination angle controller configured to control the three-dimensional positions of the measured plane with reference to the inclination angle of the measured plane so as to locate the measured plane on the reference plane.

6. The three-dimensional inclination angle calculation circuit according to claim 5, wherein the inclination angle controller further comprises functions of setting and changing three-dimensional positions of the reference plane.

* * * * *